Figure 1:
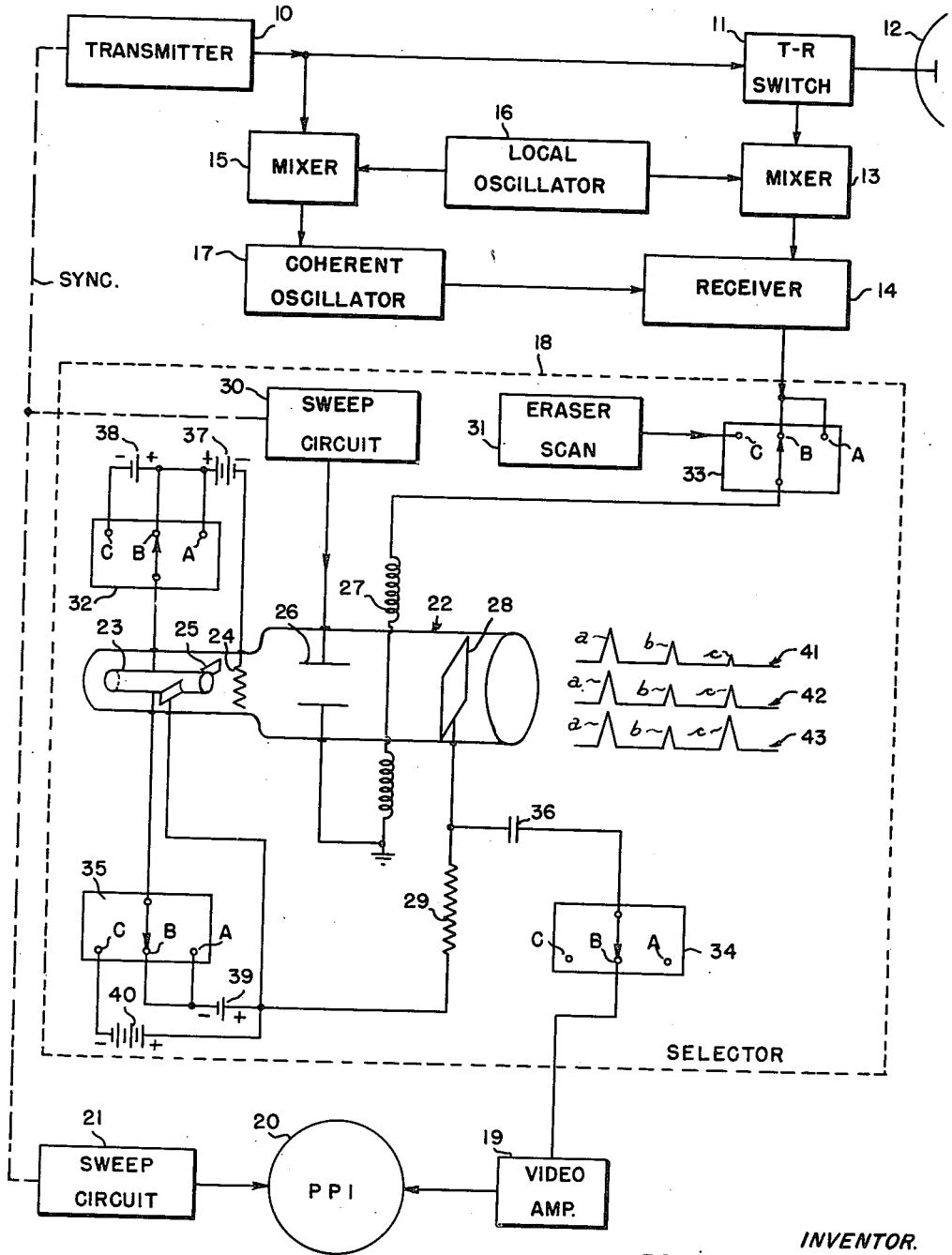

June 10, 1952 — R. A. McCONNELL — 2,600,255
MOVING TARGET INDICATION RADAR SYSTEM
Filed March 29, 1946 — 2 SHEETS—SHEET 1

INVENTOR.
ROBERT A. McCONNELL
BY
William D. Hall,
ATTORNEY

Patented June 10, 1952

2,600,255

UNITED STATES PATENT OFFICE 2,600,255

MOVING TARGET INDICATION RADAR SYSTEM

Robert A. McConnell, Emsworth, Pa., assignor, by mesne assignments, to the United States of America as represented by the Secretary of War Application March 29, 1946, Serial No. 657,934

4 Claims. (Cl. 343—9)

The present invention relates generally to a radio, pulse-echo, object-locating system adapted to differentiate between fixed and moving objects. The invention is more particularly directed to a device in such a system responsive exclusively to video pulses derived from echo pulses returning from objects in motion, said device to be hereinafter designated as a moving object selector.

In conventional radio object-locating systems wherein an exploratory beam of radio pulses is projected in space, the echo pulses received from objects intercepting the beam serve as an index to the respective locations of the objects. With conventional systems, echo pulses received from buildings, hills, trees, and other fixed objects frequently interfere with the discernment of moving object echo pulses on the viewing screen of the visual indicator. Accordingly, systems have been devised enabling an observer to distinguish between fixed and moving objects, the operation of these systems being based on the nature of the video pulses derived from echo pulses returning from reflecting objects.

In general terms, existing systems for distinguishing fixed objects from moving objects, each at least include a transmitter and an associated receiver, the transmitter being adapted to furnish successive, brief pulses of high frequency oscillations synchronized in a fixed phase relation with respect to reference oscillations provided locally at the receiver. The oscillations contained within the echo pulses returning from an object have a certain phase relation with respect to the reference oscillations, the relative phase being dependent upon the instantaneous range of the object and varying with the radial velocity component thereof.

In the case of an object in motion, the resultant change in range causes the relative phase to shift from pulse to pulse. It will be evident that if the echo pulses are algebraically combined with the reference oscillations they will reinforce or oppose each other to a degree varying in accordance with the relative phase therebetween. By detecting the resultant algebraic combination, video pulses are developed, the amplitude of said video pulses being a function of said relative phase. Since in the case of moving objects the phase of successive echoes relative to reference oscillations undergoes continuous variation, the resulting successive video pulses vary in a cyclical manner as the relative phase shifts progressively from phase coincidence to phase opposition.

In contradistinction fixed objects reflect successive echo pulses having an unchanging phase relative to the reference oscillations; therefore the resultant video pulses have a constant amplitude. For a more detailed description of a system of this type reference may be had to a copending application of R. H. Dicke, Serial No. 599,052, filed April 24, 1945, entitled Communication System, which was issued December 26, 1590, as Patent No. 2,535,274.

By displaying the video pulses from both fixed and moving objects on a visual indicator of the cathode ray oscilloscope type, wherein a Cartesian representation ("A" type) of signal strength versus object range is shown, the observer, by noting the character of the pulses on the viewing screen, is able to generally distinguish moving objects from fixed objects. In certain object-locating applications, where only moving objects are of interest to the observer, it is desirable to completely remove all fixed object pulses from the viewing screen, and some device adapted to perform this function is necessary.

If, however, video pulses from moving and fixed objects are applied to a visual indicator of a plan position type (PPI tube) wherein a maplike, polar coordinate presentation is developed on the viewing screen, there is no way for the observer to distinguish fixed from moving objects. Accordingly, it is desirable, where only moving objects are of interest, to employ in conjunction with a PPI tube a device adapted to eliminate fixed object echoes from the viewing screen. Similarly with other forms of indicator presentations, the need exists for a device of this character.

In view of the foregoing, it is an object of this invention to provide a radio, pulse-echo, object-locating system, incorporating a moving object selector, wherein only video pulses representing moving objects appear on the viewing screen of the visual indicator.

More specifically, it is an object of this invention to provide a moving object selector utilizing a low-velocity, storage-mosaic tube for its operation.

Another object of the invention is to provide means for modulating a low-velocity storage-mosaic tube whereby output pulses are obtained only in response to varying amplitude video input pulses.

Briefly stated, these objects are attained in a pulse echo object-locating system incorporating a moving object selector including a low-velocity, storage-mosaic tube and means for introducing the video pulses derived from moving and fixed object echo pulses into the tube whereby corresponding output pulses are yielded therefrom only on response to applied video pulses which vary in amplitude. The selector is interposed between the pulse receiver and the oscilloscope indicator so as to eliminate all fixed object indications from the viewing screen of the latter.

For a better understanding of this invention as well as other objects and further features thereof, reference is had to the following detailed description to be read in connection with the accompanying drawings wherein like components in the figures are identified by like numerals. The scope of the invention will be pointed out in the accompanying claims.

Figure 2:
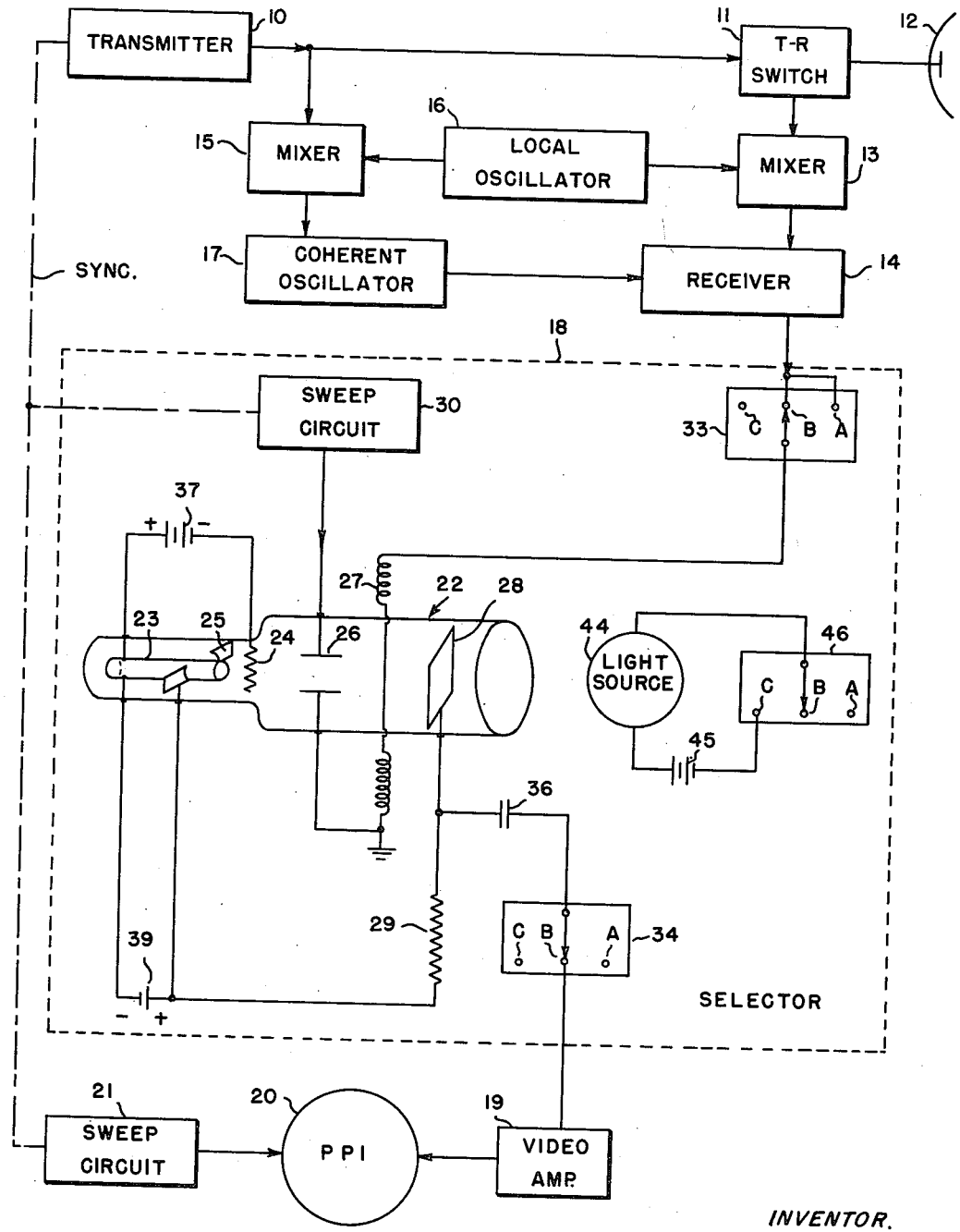

In the drawings:

Fig. 1 is a block diagram of a first preferred embodiment of a radio object-locating system operating in accordance with the present invention; and Fig. 2 is a block diagram of a second preferred embodiment.

Referring now to the drawings and more particularly to Fig. 1, a system is shown adapted to distinguish fixed from moving objects, the system including a radio transmitter 10 for generating high frequency exploratory pulses which are fed through a transmit-receive (T-R) switch 11 to a suitable directional scanning antenna 12. A receiving channel is associated with antenna 12, said channel including a mixer 13 having one input circuit connected to transmit-receive switch 11, the output circuit thereof being connected to a receiver 14.

Transmit-receive switch 11 functions during the transmission periods of the exploratory pulses to couple transmitter 10 to antenna 12 and to disconnect the receiving channel. In the interim between pulses, transmit-receive switch 11 functions to disconnect transmitter 10 from antenna 12 and couple the antenna to the receiving channel.

A small portion of each of the transmitted pulses is applied to one input circuit of a mixer 15, the other input circuit being connected to a local oscillator 16. The beat frequency output of mixer 15 is then applied as a synchronizing pulse to a coherent oscillator 17, which is an oscillator generating intermediate-frequency, reference oscillations having a fixed phase relation, i. e., in coherence, with respect to the transmitted exploratory pulses.

During reception periods, echo pulses received by antenna 12 are fed through transmit-receive switch 11 to one input circuit of mixer 13, the other input circuit being connected to local oscillator 16. The beat frequency output of mixer 13 consists of echo pulses having a frequency substantially equal to the frequency of the reference oscillations issuing from coherent oscillator 17 but displaced in phase therefrom as a function of the radial velocity of the object. The output from mixer 13 and the reference oscillations from coherent oscillator 17 are then applied to receiver 14.

Receiver 14 preferably has a linear-logarithmic characteristic operating in a manner whereby the characteristic is linear for echo pulses below a predetermined signal level and substantially logarithmic for echo pulses of higher amplitude.

The echo pulses and reference oscillations are heterodyned together in receiver 14 and the resulting combination is detected therein to provide video pulses. The output of receiver 14 consists of two distinct types of video pulses. One type consists of video pulses corresponding to fixed objects, having substantially constant amplitude, whereas the second type consists of those video pulses corresponding to moving objects and having a cyclical variation in amplitude, the cyclical rate being a function of the radial component of object velocity.

The video output from linear logarithmic receiver 14 is applied through a moving object selector 18, described in detail hereinafter, to a video amplifier 19, the output of the amplifier being injected on the intensity grid of a PPI tube indicator 20. Indicator 20 operates in a well known manner to provide a polar coordinate presentation on a viewing screen of all moving objects scanned by antenna 12. A radial line is traced on PPI tube 20 by means of a sweep circuit 21 associated with the deflection means of the tube, the radial line being angularly rotated in accordance with the scanning movement of antenna 12. Sweep circuit 21 is synchronized with transmitter 10 so that the radial line is produced by a luminescent spot which starts traveling outwardly from the center of the screen at the instant of pulse transmission.

Moving target selector 18 employs a low-velocity, storage-mosaic tube 22 preferably of the type commonly known as "Orthiconoscope" or "Orthicon." Tube 22 includes within an evacuated envelope an electron-beam gun 23 having a grid electrode 24 for controlling the beam density, a collector electrode 25, horizontally deflecting plates 26, vertically deflecting magnetic coils 27, and a storage-mosaic element 28.

Mosaic 28 is of conventional design and consists of a dielectric plate, on one side of which is a metallic coating called the signal plate, the other side of the dielectric being coated with separately insulated emissive photoelectric particles, microscopic in size. These particles when bombarded by an electron ray beam emit secondary electrons. It is therefore evident that in effect the mosaic is constituted of a myriad of tiny capacitors, one side of each capacitor consisting of an emissive particle, the second side thereof being the signal plate. A connection from the signal plate through the glass envelope to an external terminal is provided. By connecting a load resistor 29 between this output terminal and collector 25 an output signal may be developed thereacross under certain conditions.

In order to clarify the behavior of the mosaic in response to a low-velocity electron beam, it is first desirable to discuss briefly mosaic action as it would occur with a high-velocity beam such as employed in the conventional iconoscope. For simplicity let it be assumed that a high-velocity electron beam is stationary and impinges on the mosaic at a particular point. As the beam strikes the mosaic the emissive particles under the incident beam will emit secondary electrons. By reason of the high-beam velocity the number of secondary electrons emitted exceeds the number of incident electrons so that the emissive particles become positively charged. As a result, a corresponding negative charge is built up on the signal plate in the usual manner of a capacitor.

As the emissive particles become increasingly positive, fewer secondary electrons are released inasmuch as the positive potential draws them back to said particles. In consequence, the number of incident beam electrons striking the emissive particles equals the number of secondary electrons emitted therefrom and a state of equilibrium is reached. When such an equilibrium exists no additional charge is accumulated by the emissive particles, hence no charging current flows to supply a negative charge to the signal plate.

Considering now the case of a stationary low-velocity beam in connection with tube 22, electrons emitted from gun 23 are focused so as to constitute a beam of electrons arriving at approximately normal incidence to mosaic 28. The bombarding voltage is made sufficiently low so that the secondary emission ratio is less than unity, that is to say, a greater number of incident electrons arrive at the particles than leave by secondary emission. To attain their equilibrium, the mosaic particles are driven to the cathode potential of gun 23 at which potential the beam can no longer reach the particles, being repelled so as to return to collector 25 which is at a potential with respect to cathode sufficient to insure effective collection of electrons which approach it.

Particles of mosaic 28 which are illuminated become slightly positive as a result of stored charges arising from photoelectric emission. When the positive particles are bombarded by an electron beam, the charge is released and the elements are again driven to cathode potential and equilibrium.

In the case of a moving electron beam, if the beam density is adequate and the scanning rate is not too high, the equilibrium or repelling potential will be reached by every point which is scanned. This is the phenomenon underlying the operation of selector 18. The video pulses in the output of receiver 14 are introduced into tube 22 so as to repeatedly scan a Cartesian representation on mosaic 28 of signal strength versus range, for example, range to be represented by a horizontal deflection and signal amplitude by a vertical deflection.

Upon the completion of the first scan cycle, all the particles in the path of the mosaic trace are brought to the equilibrium potential. Thereupon, in the event the successive video pulses in the second and subsequent scan cycles are all substantially identical in amplitude (fixed object echoes) the beam will not reach the mosaic since all the particles in the trace path are already at equilibrium and act to repel the incident beam.

But in the event a successive pulse in the second and subsequent scan cycles is of different amplitude (a moving object echo) the beam will reach the mosaic at those points where the scanning pattern departs from the first scan cycle and a charging current will flow with every change of video pulse amplitude. Thus, in the output of tube 22 only pulses will appear which correspond with input video pulses of varying amplitude.

In practice, the above described process is accomplished by associating with storage-mosaic tube 22 a linear sweep circuit 30, an eraser scan generator 31, and four rotary switches 32, 33, 34, and 35, each switch having a movable contactor and three corresponding stationary contacts A, B, and C, all of switches 32 and 35 operating in unison. While switches 32 and 35 are herein described in mechanical terms, in an actual embodiment they are preferably of electronic design, since they are required to operate at a very high speed.

The output of sweep generator 30 is applied to the horizontally deflecting plates 26, the sweep being synchronized with sweep circuit 21 associated with PPI tube 20. The vertically deflecting coils 27 are connected to the output of receiver 14 through switch 33 when said switch is closed at the B contact.

Video pulses established across load resistor 29 are applied to video amplifier 19 through switch 34 only during the time said switch is closed at the B position, resistor 29 being coupled to the movable contactor of switch 34 by means of a capacitor 36.

A bias battery 37 is connected between grid 24 and gun 23 through the A and B contacts of switch 32, while a battery 38, connected in opposing polarity between the C and B contacts of said switch, serves to reduce the grid bias when the switch is closed on the C contact.

The cathode of gun 23 is connected by a battery 39 to the collector 25 through the A and B contacts of switch 35, while the contact C of said switch serves to connect therebetween a battery 40 providing a greatly increased voltage relative to battery 39.

The operation of selector 18 is cyclical and involves three steps, step 1 being effected at the A positions of switches 32 to 35, step 2 at the B positions, and step 3 at the C positions.

Steps 1 and 2 commence at successive transmitted pulses. The operation of selector 18 is as follows:

*Step 1.*—It will be assumed at the outset that mosaic 28 is at a uniform slightly positive potential with respect to the cathode of gun 23. The electrode potentials applied in this step are such that the tube operates in a low-velocity manner. The video pulses from receiver 14 are applied to the vertically deflecting coils 27 while the linear sweep 30 is applied to the horizontally deflecting plates 26, thereby producing a single Cartesian pattern of range versus amplitude as shown pictorially in form 41 wherein video pulses *a, b,* and *c* indicate echoes returning from different objects. The electron beam will trace the pattern shown by form 41 on the mosaic 28 and release the positive charge of the scanned particles, thereby bringing all the particles in the trace path to equilibrium and cathode potential. Step 1 lasts for the duration of a single scan cycle. Video amplifier 19 is disconnected from the output of selector 18 during step 1 so that no pulses appear on the screen thereof.

*Step 2.*—The video amplifier 19 is now connected to the output of selector 18 and the beam scans a second pattern 42 wherein pulses *a, b,* and *c* represent successive echoes to those correspondingly designated in pattern 41. It will be seen that the amplitude of pulses *a* and *b* in patterns 41 and 42 are unchanged whereas pulse *c* is greater indicating the presence of a moving object. The beam will approach but not reach the mosaic 28 except at those points in pulse *c* where the pattern 42 of step 2 departs from the pattern 41 in step 1, since at all other points the particles are in equilibrium. At the points of departure a video signal is generated at the signal plate and is amplified by video amplifier 19 and presented by PPI tube 20. Step 2 may be repeated as desired, a video output resulting whenever the beam reaches mosaic 28. Thus in the third pattern 43, pulse *c* differs in amplitude from pulse *c* in pattern 42 and a video output results thereby.

*Step 3.*—Receiver 14 and video amplifier 19 are now disconnected from selector 18. The potential of the cathode of gun 23 relative to collector 25 is raised by battery 40 so as to cause the secondary emission ratio of the mosaic to go above unity and the reduced voltage on the grid 24 increases the beam density. The eraser scan 31 produces a pattern in conjunction with sweep 30 in a manner as to discharge the mosaic in a positive direction with uniformity. If the focus of the electron beam is sufficiently poor, the single sweep or even a stationary beam may be adequate for this purpose. Since the mosaic particles are again positive, the mosaic is now prepared for a new selector cycle and the above described process is repeated for the next train of arriving echoes.

It will be seen that in step 2 when the PPI indicator is connected to selector 18, only moving object echoes are permitted to appear on the viewing screen which is free of all fixed object indications.

An alternative method of effecting the purpose of step 3 is shown in Fig. 2 wherein those components in selector 18 similar both in construction and operation with those in Fig. 1 are identified by like numerals, otherwise additional numerals are provided.

Instead of impressing voltages on the electrodes of tube 22 as in step 3 of Fig. 1 so as to obtain a high velocity beam and thereby impart a positive charge to the particles of mosaic 28, the voltages in step 3 of Fig. 2 are maintained at the same level as in steps 1 and 2, the beam remaining of low velocity during all three steps. Therefore, switches 32 and 35 shown in Fig. 1 are deleted in Fig. 2. In effect, however, the same erasure result is obtained without increasing beam velocity by providing an external light source 44 which is focused on mosaic 28. Light source 44 is energized on step 3 by a suitable battery 45 connected thereto by means of rotary switch 46 which completes the circuit when closed on contact C. Switch 46 operates in unison with switches 33 and 34.

Photoelectric emission from the particles of mosaic 28, upon being uniformly illuminated by light source 44, acts to erase the Cartesian pattern of the prior steps and causes the particles to become uniformly positive in preparation for step 1. The rate of erasure may be controlled by the light intensity.

It is to be understood that while the invention has been illustrated in connection with an indicator of the PPI type, the invention is operable with equal success in cooperation with other forms of indicators such as the "A" type. Moreover, while for the sake of simplicity the pattern scanned on mosaic 28 has been described herein as being of the Cartesian or "A" type, it will be apparent that other patterns, such as a folded pattern, making fuller use of the mosaic may be employed, if desired, in lieu thereof.

It is also to be noted that the present invention may be embodied so as to operate with a low-velocity storage-mosaic tube utilizing a velocity modulation technique to effect selection between moving and fixed object echoes. In this instance, the beam projected from gun 23 may be made, by well known means, to scan a spiral pattern or any other desired pattern making full use of the mosaic area. The scanning velocity of the beam is varied in accordance with the video output pulses from receiver 14, that is to say, the time necessary for the beam spot to traverse a unit distance in the spiral path is proportional to the applied video input voltage.

Employing with the velocity modulation technique the same step-wise switching process as illustrated in connection with either Fig. 1 or Fig. 2, it will then be seen that as a result of step 3 the mosaic spiral track is at a suitable uniform potential which is positive (of the order of +3 volts, let us say) relative to the cathode of gun 23. On step 1, particles in the mosaic track will be driven to a variable potential of less than +3 volts, the exact potential of each point in the track depending upon the video echo pulse corresponding to some particular object range and emanating from receiver 14 at the instant of scanning that point.

On step 2 the scan will repeat as in step 1. If the echo pattern is unchanged, the beam will everywhere fail to meet mosaic 28 since it had reached equilibrium on the preceding sweep. Suppose now that as a result of a moving object at some range the applied video echo pulse while scanning the corresponding mosaic point is more negative than in step 1. At this point, the electron beam will reach the mosaic and deliver a negative charge so that a new equilibrium will be obtained. This charge flowing through load resistor 29 will develop an output pulse which will be increased in video amplifier 19 and displayed on indicator 20. Such output pulses will occur only at ranges corresponding to moving objects.

To further facilitate the erasure of the pattern in step 3, a step potential may be applied to a suitable electrode such as a second anode (not shown) to increase the beam velocity.

A more extended treatment of storage-mosaic action in connection with high and low velocity beams may be found in chapter 10 of "Television" by Zworykin and Morton, published in 1939 by John Wiley and Sons.

There has been shown what is at present considered to be preferred embodiments of the invention. It will be obvious that many changes and modifications may be made therein without departing from the invention. For example, while the invention has been described in connection with a low-velocity, storage-mosaic tube utilizing deflection or velocity modulation, the invention is also operable with such a tube using intensity modulation.

What is claimed is:

1. A radio object locating system including means for transmitting successive exploratory pulses of high frequency oscillations, means for obtaining reference oscillations synchronized in a fixed phase relation to the carrier oscillations of each of said exploratory pulses, means for receiving echo pulses from fixed and moving objects and means for combining said reference oscillations and said echo pulses to obtain corresponding video pulses of two types, the first type consisting of video pulses having a cyclical variation in amplitude and corresponding to moving objects, the second type consisting of video pulses of substantially constant amplitude and corresponding to fixed objects, a pulse-operated indicator, a moving object selector comprising a low-velocity storage-mosaic tube, said tube including at least a mosaic element having a signal plate, means for generating an electron beam, means for directing said beam to said mosaic element, beam deflection means and a collector element, an external load impedance connected between said signal plate and said collector element, a sweep circuit synchronized with said transmitted pulses and connected to said beam deflection means to provide beam deflection in one direction, means for applying both types of said video pulses to said deflection means to deflect said beam in a second direction whereby a video pulse pattern may be traced on said mosaic element, means for erasing said pattern, switching means for periodically connecting said indicator to said load impedance at a time when output pulses are developed thereacross corresponding to said first type of video pulses, and switching means connected to said erasure means for periodically erasing said pattern on the screen of said tube.

2. In a radio object locating system of the character described wherein succesive exploratory pulses are transmitted and wherein two types of video pulses are derived from received echo pulses, the first type consisting of video pulses having a cyclical variation in amplitude and corresponding to moving objects, the second type consisting of video pulses having a substantially constant amplitude and corresponding to fixed objects, the combination comprising a pulse operated indicator and a moving object selector including a low-velocity storage-mosaic tube, said tube having at least a mosaic element having a signal plate, means for generating an electron beam, means for directing said beam to said mosaic element, beam deflection means and a collector element, an external load impedance connected between said signal plate and said collector element, a sweep circuit synchronized with said transmitted pulses and connected to said beam deflection means to provide beam deflection in one direction, means for applying both types of said video pulses to said deflection means to deflect said beam in a second direction whereby a pulse pattern may be traced on said mosaic element, means for erasing said pattern from said mosaic, switching means for periodically connecting said indicator to said load impedance at a time when output pulses are developed thereacross corresponding only to said first type video pulses, and switching means connected to said erasure means for periodically erasing said pattern on the screen of said tube at a time subsequent to the development of said output pulses.

3. The combination as defined in claim 2 wherein said erasure means includes a light source and means for focusing said source so as to uniformly illuminate said mosaic element.

4. In a radio object locating system of the character described wherein two types of video pulses are provided, the first type consisting of video pulses having a cyclical variation in amplitude and corresponding to moving objects, the second type consisting of video pulses of substantially constant amplitude and corresponding to fixed objects, a pulse-operated indicator, a moving object selector comprising a low-velocity storage-mosaic tube, said tube including at least a mosaic element having a signal plate, means for generating an electron beam, means for directing said beam to said mosaic element, means for modulating said beam and a collector element, an external load impedance connected between said signal plate and said collector element, and means for applying both types of said video pulses to said beam modulation means so that only said first type of video pulses having a cyclical variation in amplitude cause corresponding output pulses to be developed across said load impedance, and means for applying said output pulses to said indicator to provide an indication of moving objects only.

ROBERT A. McCONNELL.

REFERENCES CITED

The following references are of record in the file of this patent:

UNITED STATES PATENTS

| Number | Name | Date |
| --- | --- | --- |
| 2,406,316 | Blumlein et al. | Aug. 27, 1946 |
| 2,407,000 | Evans | Sept. 3, 1946 |
| 2,408,742 | Eaton | Oct. 8, 1946 |
| 2,437,173 | Rutherford | Mar. 2, 1948 |
| 2,451,005 | Weimer | Oct. 12, 1948 |
| 2,491,450 | Holmes | Dec. 13, 1949 |
| 2,512,144 | Emslie | June 20, 1950 |